United States Patent [19]

Hessert

[11] 3,818,998

[45] June 25, 1974

[54] METHOD OF REDUCING LOST CIRCULATION DURING WELL DRILLING

[75] Inventor: James E. Hessert, Bartlesville, Okla.

[73] Assignee: Phillips Petroleum Company, Bartlesville, Okla.

[22] Filed: June 27, 1972

[21] Appl. No.: 266,684

[52] U.S. Cl. .................................. 175/72, 166/294
[51] Int. Cl. ............................................. E21b 21/04
[58] Field of Search ................ 166/294; 175/72, 64; 252/8.5 LC

[56] References Cited
UNITED STATES PATENTS

| | | | |
|---|---|---|---|
| 2,867,584 | 1/1959 | Scott | 175/72 |
| 3,082,823 | 3/1963 | Hower | 166/294 |
| 3,208,524 | 9/1965 | Horner | 166/294 |
| 3,353,601 | 11/1967 | Dollarhide | 175/72 |
| 3,378,070 | 4/1968 | Epler et al. | 166/294 |
| 3,502,149 | 3/1970 | Pence | 166/294 |
| 3,593,799 | 7/1971 | Boughton et al. | 166/295 |
| 3,611,733 | 10/1971 | Eilers et al. | 166/294 |
| 3,658,129 | 4/1972 | Gall et al. | 166/294 |
| 3,727,687 | 4/1973 | Clampitt et al. | 166/294 |

*Primary Examiner*—Henry C. Sutherland
*Assistant Examiner*—Jack E. Ebel

[57] ABSTRACT

Water-dispersible cellulose ethers, polysaccharides and polyarcylamides can be crosslinked by contacting with a hexavalent chromium compound and a polyhydric alcohol. Crosslinking results in the formation of a rubbery gel which swells in the presence of water. By introducing the gell into a permeable subterranean zone, to which drilling fluid is being lost during a drilling operation, and contacting it with water, the gel can be caused to swell and reduce the permeability of the zone.

11 Claims, No Drawings

3,818,998

METHOD OF REDUCING LOST CIRCULATION DURING WELL DRILLING

BACKGROUND OF THE INVENTION

This invention relates to crosslinked cellulose ethers, polyacrylamides or polysaccharides. In another aspect, this invention relates to a method for combatting lost circulation during drilling of a well.

In the rotary drilling of wells, the drilling operation depends on a continuous circulation of drilling fluid from the earth's surface to the bottom of the wellbore and back to the surface of the earth. As the drilling progresses, various earth formations are encountered and many of these formations have openings in them ranging from small holes and cracks to large fissures and the like. When such openings in the formations are encountered, drilling fluid flows into them and, in many cases, circulation stops, so that it is necessary to seal the opening before the drilling can be continued.

The problem of combatting lost circulation in drilling wells is often very difficult to solve. By far the greater number of serious lost circulation zones are found at relatively shallow depths where temperatures are low. Lost circulation is combatted in many ways such as by adding granular, flake, or fibrous material of various sizes to the drilling mud. On some occasions such remedial measures are unsuccessful and other approaches are tried. One of the other approaches is to place cement in the wellbore to fill the voids and fissures which caused the lost circulation.

SUMMARY OF THE INVENTION

It is an object of this invention to reduce lost circulation during the drilling of a well.

In accordance with this object, I have found that crosslinking cellulose ethers, polyacrylamides or polysaccharides at high polymer concentrations by contacting the polymer with a hexavalent chromium compound and reducing at least a portion of it to a trivalent state with a polyhydric alcohol results in a rubbery gel that will swell in the presence of water. The gel can be readily comminuted or shredded and introduced to a zone in a well which is permeable to drilling mud and there contacted with water. The water will cause the gel to swell in situ and thereby reduce the permeability of the zone to which the drilling mud is being lost. In this way, the problem of lost circulation can be eliminated.

DESCRIPTION OF THE PREFERRED EMBODIMENTS

In a presently preferred embodiment of this invention, a polymer selected from the group consisting of water-dispersible cellulose ethers, water-dispersible polyacrylamides or water-dispersible polysaccharides is contacted at high polymer concentration with a hexavalent chromium compound and a polyhydric alcohol which will reduce the hexavalent chromium to the trivalent state. The trivalent chromium causes crosslinking of the polymer resulting in a tough, rubbery gel. This gel can be shredded and, owing to its porosity, swells in the presence of water. By introducing the gel to a thief zone of an earthen formation to which drilling fluid is being lost and contacting it with water, the permeability of the thief zone to drilling fluid can be reduced.

In general, any of the water-dispersible cellulose ethers, polyacrylamides, or polysaccharides can be used in preparing the gels used in the practice of this invention. The term water-dispersible is intended to apply to truly water soluble cellulose ethers, polyacrylamides, or polysaccharides as well as those which can be dispersed in colloidal form into water.

The cellulose ethers which can be used include, among others: the various carboxy alkyl cellulose ethers such as carboxyethyl cellulose and carboxymethyl cellulose (CMC); mixed ethers such as carboxyalkyl hydroxyalkyl ethers such as carboxymethyl hydroxyethyl cellulose (CMHEC); hydroxyalkyl celluloses such as hydroxyethyl cellulose and hydroxy propyl cellulose; alkyl hydroxyalkyl celluloses such as methyl hydroxy propyl cellulose; alkyl celluloses such as methyl cellulose, ethyl cellulose and propyl cellulose; alkyl carboxy alkyl celluloses such as ethyl carboxy methyl cellulose; alkyl alkyl celluloses such as methylethyl cellulose; and the like. Many of the cellulose ethers are available commercially in various grades. The carboxysubstituted ethers are available as the alkaline metal salt, usually the sodium salt. However, the metal is seldom referred to and they are commonly referred to as CMC for carboxy methyl cellulose and CMHEC for carboxy methyl hydroxy ethyl cellulose, etc. A presently preferred cellulose ether is CMC. Water-dispersible CMC is available in various degrees of carboxylate substitutions ranging from about 0.3 up to the maximum degree of substitution of 3.0. In general, CMC having a degree of substitution in the range of 0.65 to 0.95 is preferred. CMC having a degree of substitution in the range of 0.85 to 0.95 is a more preferred cellulose ether. CMC having a degree of substitution less than the above-preferred ranges is generally less uniform in properties and thus less desirable. CMC having a degree of substitution greater than the above preferred ranges usually has a lower viscosity and more is required in preparing suitable gels. The degree of substitution of CMC is commonly designated in practice as CMC-7, CMC-9, CMC-12, etc., where the 7, 9, and 12 refer to a degree of substitution of 0.7, 0.9 and 1.2 respectively.

The polyacrylamides which can be employed in this invention include the homopolymers and copolymers of acrylamide and methacrylamide. It is generally preferred to employ the substantial linear homopolymers and copolymers of acrylamide and methacrylamide. By substantially linear it is meant that the polymers are substantially free of crosslinking between the polymer chains. Said polymers can have up to about 75, preferably up to about 45 percent of the carboxamide groups hydrolyzed to carboxyl groups. As used herein, and in the claims, and as otherwise specified, the term "hydrolyzed" includes modified polymers wherein the carboxyl groups are in the acid form and also such polymers wherein the carboxyl groups are in the salt form, provided such salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Substantially linear polyacrylamides are known in the art and can be obtained commercially. They are generally obtained by carrying out the polymerization in an aqueous medium, in the presence of a small but effective amount of a water-soluble oxygen-containing catalyst, e.g., a thiosulphate or bisulphate or potassium or sodium or in an organic hydroperoxide, at a temperature between about 30° and 80°C. The resulting polymer is recovered from the aqueous medium, as by drum drying, and can be subsequently ground to the desired particle size.

Included among the copolymers which can be used to prepare gels for use in the practice of the invention are the water-dispersible copolymers resulting from the polymerization of a major portion of the acrylamide or methacrylamide and a minor portion of an ethylenically unsaturated monomer copolymerizable therewith. It is desirable that sufficient acrylamide or methacrylamide be present in the monomers mixture to impart to the copolymer the above-described water-dispersible properties, for example, from about 90 to 99 percent acrylamide and from about 1 to 10 percent other ethylenically unsaturated monomers. Such other monomers include acrylic acid, methacrylic acid, vinyl sulfonic acid, vinyl benzyl sulfonic acid, acrylonitrile, methylacrylonitrile, vinyl alkyl ether, vinyl chloride, maleic anhydride, and the like.

Various methods are known in the art for preparing said copolymers. For example, see U.S. Pat. Nos. 2,625,529; 2,740,522; 2,729,557; 2,831,841; and 2,909,508. Said copolymers can also be used in hydrolyzed form, as discussed above for the homopolymers.

Suitable polysaccharides include the ionic heteropolysaccharides produced by fermentation of carbohydrates by bacteria of the genus Xanthomonas. Exemplary of such heteropolysaccharides are those produced by Xanthomonas campestris, Xanthomonas begonia, Xanthomonas phaseoli, Xanthomonas hederae, Xanthomonas incanae, Xanthomonas carotae, and Xanthomonas translucens. Of these, ionic polysaccharide B-1459 is preferred. This polysaccharide is prepared by culturing the bacterium Xanthomonas campestris NRRL B-1459, United States Department of Agriculture, on a well-aerated medium containing commercial glucose, organic nitrogen sources, dipotassium hydrogen phosphate, and various trace elements. Fermentation is carried out to completion in 4 days or less at a pH of about 7 and a temperature of 28°C. Polysaccharide B-1459 is commercially available under the trade name of "Kelzan" from the Kelco Company, San Diego, Calif.

In general, any hexavalent chromium compound which can be readily reduced to the trivalent state by the polyhydric alcohol reducing agent can be employed in this invention. Examples of such compounds include ammonium chromate, ammonium dichromate, the alkali metal chromates, the alkali metal dichromates, and chromium trioxide. Sodium dichromate and potassium dichromate, because of low cost and ready availability are the presently preferred chromium containing compounds. The hexavalent chromium in said chromium compounds is reduced in situ to trivalent chromium by the reducing agent as discussed hereinafter.

Polyhydric alcohols of a wide variety are suitable for use in this invention. These include the glycols, polyoxyalkylene glycols, glycerols and mixtures thereof. Examples of such polyhydric alcohols include ethylene glycol, 1,2-propane diol, 1,3-propane diol, 1,3-butane diol, 1,4-butane diol, 1,5-pentane diol, 1,6-hexane diol, 1,10-decane diol, pinacol, polymers of ethylene oxides of the formula $HOCH_2CH_2—(OCH_2CH_2)_x—OCH_2CH_2OH$ wherein $x$ has a value from 0–10, glycerol, 1,2,4-butane triol, 1,2,6-hexane triol, and the like. A presently preferred reducing agent is a mixture one part by volume glycerol in four parts ethylene glycol.

The amount of hexavalent chromium compound employed would be an effective amount to cause gelation of the polymer after its reduction to trivalent chromium. The lower limit of the concentration of the hexavalent chromium compound will depend upon several factors including the particular type of polymer used. Similarly, the upper limit on the concentration of the starting hexavalent chromium compound cannot always be precisely defined. Generally, the amount of the starting hexavalent chromium compound used in preparing the gels of this invention will be in the range of from about 0.05 to 60, preferably 0.1 to 40 weight percent of the amount of the polymer used.

The amount of reducing agent employed will be an amount effective to reduce at least a portion of the hexavalent chromium metal in the chromium compound to the trivalent state. Thus, the amount of reducing agent to be used depends, to some extent at least, upon the amount of the starting hexavalent chromium containing compound which is employed. In many instances, it will be preferred to use an excess of reducing agent to compensate for dissolved oxygen in the water employed, if any, exposure to air during preparation of the gels, and possible contact with other oxidizing substances such as might be encountered in the field operation. As a general guide, the amount of reducing agent used will generally be within the range of from about 0.1 to at least 150, preferably at least about 200 weight percent of the stoichiometric amount required to reduce the metal in the starting hexavalent chromium compound to the trivalent state.

The gels suitable for use in this invention can be prepared in a variety of ways. However, it is important to note that the polymers should be crosslinked at high concentrations. Therefore, crosslinking should be done in the absence of substantial quantities of solvent or dispersant material.

In addition to the polymer, hexavalent chromium compound and polyhydric reducing agent, amounts of water may be employed. Normally the amount of water employed in the crosslinking stage will not exceed about 100 weight percent of the amount of polymer used. Preferably, the amount of water will not exceed about 75 weight percent of the amount of polymer.

Small quantities of an acid solution may be added when the ingredients of the gel are combined to accelerate the reduction of the hexavalent chromium to the trivalent state. Dilute hydrochloric acid, e.g., 5–15 percent in water, is suitable for this purpose.

Generally speaking, the ingredients of the gel can be combined in any order. A preferred method for obtaining the rubbery gel for later dispersal in water involves first combining the hexavalent chromium compound and polyhydric alcohol with water, if employed, followed by the addition, normally with stirring, of the polymer. The intimately mixed ingredients are then allowed to stand until the gel forms. The amount of time required may vary according to the nature of the polymer, concentration of chromium compound and of polyhydric alcohol, as well as other factors.

The gels obtained in this way can be described as porous or spongy and swell when water is added. They can be comminuted or shredded and in this form dispersed readily into water in any desired concentration. The effect of dispersing them in water is to increase the viscosity relative to a water dispersion of the uncrosslinked polymer at a similar concentration.

The following examples will serve to further illustrate the invention.

EXAMPLE I

Sodium dichromate dihydrate (0.15 grams) was dissolved in distilled water (30 milliliters). To this solution was added 90 milliliters of a 1 to 4 mixture by volume of glycerol and ethylene glycol. Within 1 minute, 50 grams of CMC 9H were stirred into the mixture. Within 5 minutes, this mixture became a gelatinous mass. The mass was shredded and dispersed in tap water. A dispersion of this gel in Bartlesville, Okla., tap water (5,000 ppm based on total polymer concentration in water) had a viscosity of 150 cp as compared to a viscosity of 35 cp for ungelled CMC 9H in water at the same concentration.

EXAMPLE II

A gel was prepared in the same manner as Example I, using instead of CMC 9H, a polyacrylamide having a molecular weight of 10 million wherein 21 percent of the amide groups had been hydrolyzed. Such a polyacrylamide is available commercially from the Dow Chemical Company under the trademark Dow Pusher 1000. The gel obtained was extremely tough and was shredded and dispersed into water. A dispersion of 2,500 parts per million of the gel in water possessed a 25 percent higher viscosity than did a dispersion of ungelled polyacrylamide of the same concentration.

Examples I and II demonstrate the increase in viscosity which can be obtained by dispersing the shredded gel into water relative to the viscosity of the ungelled polymer at a similar concentration.

EXAMPLE III

Sodium dichromate dihydrate (0.25 grams) was dissolved in 5 milliliters of distilled water to which had been added 0.5 milliliters of 5 percent hydrochloric acid. To this solution was added 50 milliliters of a 1 to 4 mixture, by volume, glycerol and ethylene glycol. Within 1 minute, 20 grams of Kelzan MF, a polysaccharide available from Kelco Company of San Diego, California was added. Within 30 minutes a porous spongy solid was obtained. Shredded particles of the spongy solid one-eighth to one-fourth inch on the side were dispersed in water. The particles readily swelled in water.

EXAMPLE IV

A gel was prepared according to the procedure of Example III except that 20 grams of Dow Pusher 1000 was employed in place of the polysaccharide. A solid gel was obtained within 5 minutes. After 30 minutes, the gel was shredded to form particles approximately one-eighth to one-fourth inch on the side. The particles were dispersed in water and the rate of swelling observed. Within 30 minutes, the particles had swelled to twice their original size. After 16 hours, the particles were swollen to at least about ten times the original size.

Examples III and IV demonstrate the ability of the gels of this invention to absorb water and swell to many times their original size.

When a problem of lost circulation during drilling occurs, the polymer gels of this invention may be slurried with water or drilling mud and pumped into the permeable zone responsible for the loss. Normally the polymer gel will be comminuted or shredded to a particulate form in order to better penetrate the permeable zone. Generally, particles having an average dimension of less than about one-half inch to the side will be employed. Preferably, the particles will be from about one-eighth to one-fourth inch on the side. Optionally, other materials employed in combatting lost circulation such as hay, sugar cane fibers, cotton seed hull, textile fibers, asbestos, feathers, shredded paper, bentonite, rubber pulp, wood shavings, nut hulls, and the like may also be included in the slurry with the shredded polymer. Drilling can be resumed when the gelled polymer has swollen sufficiently to reduce lost circulation to a tolerable limit.

I claim:

1. The method of combatting lost circulation of drilling fluid to a zone in a well permeable to said drilling fluid comprising
    a. forming a polymer gel by contacting a polymer selected from the group consisting of
        1. a water-dispersible cellulose ether,
        2. a water-dispersible polyacrylamide, and
        3. a water-dispersible polysaccharide with a hexavalent chromium compound in an amount sufficient to gel said polymer when at least a portion of said chromium is reduced to the trivalent state and an amount of a polyhydric alcohol reducing agent sufficient to reduce at least a portion of said hexavalent chromium to said trivalent state and gel the polymer,
    b. comminuting or shredding said polymer gel to a particulate form having an average dimension of less than about one-half inch to the side,
    c. introducing said comminuted or shredded polymer gel into the permeable zone, and
    d. contacting said comminuted or shredded polymer gel with sufficient water to swell the gel and reduce the permeability of the permeable zone.

2. A method according to claim 1 wherein said cellulose ether is carboxymethylcellulose, said polyacrylamide is a substantially linear polymer of acrylamide, and said polysaccharide is an ionic polysaccharide produced by fermentation of carbohydrates by bacteria of the genus Xanthomonas.

3. A method of claim 2 wherein the ionic polysaccharide is B-1459.

4. A process according to claim 1 wherein said hexavalent chromium compound is selected from the group consisting of ammonium chromate, ammonium dichromate, the alkali metal chromates and dichromates, chromium trioxide, and mixtures thereof.

5. A method according to claim 1 wherein said polyhydric alcohol is selected from glycols, polyoxyalkylene glycols, glycerols, and mixtures thereof.

6. A method according to claim 5 wherein said reducing agent is a mixture of one part by volume glycerol and four parts by volume methylene glycol.

7. A process according to claim 1 wherein the amount of said hexavalent chromium compound is in the range of from about 0.5 to 60 weight percent of the amount of the polymer used and the amount of reducing agent is from about 0.1 to about 200 weight percent of the stoichiometric amount required to reduce the hexavalent chromium compound to the trivalent state.

8. A method according to claim 1 wherein said gelling occurs in the presence of water not exceeding about 100 weight percent of the amount of polymer used.

9. A method according to claim 1 wherein said reduction occurs in the presence of an acidic accelerating agent.

10. A method according to claim 9 wherein said acidic accelerating agent is dilute hydrochloric acid.

11. A method according to claim 1 wherein said polymer gel is comminuted and comprises particles from about one-eighth to one-fourth inch on the side.

* * * * *